Patented June 4, 1929.

1,716,102

UNITED STATES PATENT OFFICE.

HENRY BLUMENBERG, JR., OF MOAPA, NEVADA.

PROCESS OF PRODUCING ALUMINUM CHLORIDE.

No Drawing.  Application filed August 31, 1926. Serial No. 132,886.

My invention relates to a process of producing aluminum chloride and has for its object to provide a process whereby the same is produced in a simple, efficient and economic manner.

Aluminum chloride is used in numerous quantities in the refining of oils especially for the production of gasoline and a process whereby the cost of the production may be reduced even in a slight degree is of great economic importance.

My invention consists in the discovery that when aluminum sulphite is heated in a closed retort with a chloride of the alkali metal or alkaline earth metal groups the two salts will react and form aluminum chloride.

My invention consists in the steps of the process hereinafter described and claimed.

I take aluminum sulphide and potassium chloride in molecular proportions as indicated in the chemical equation below, though it may be advisable to use the aluminum sulphide in excess. Both salts are thoroughly dehydrated by heating to about 120° C. and the material is ground to about 100 screen mesh and thoroughly mixed before placing the same in a closed retort. From ten to twenty per cent of its volume of some carbonaceous material like gas carbon, retort carbon from the oil cracking plants, sawdust, pulverized coal or heavy fuel oil or any other reducing agent preferably is added to the mixture, the purpose being to combine with any oxygen present. The retort is heated to 600 to 700° C. which, it should be noted, is less than the volatilization point of the potassium chloride which is about 735° C. whereupon the following reaction takes place:

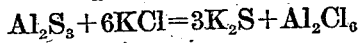

$$Al_2S_3 + 6KCl = 3K_2S + Al_2Cl_6$$

The aluminum chloride passes off as a vapor and is condensed in any suitable condenser and packed in air tight metal drums or other suitable containers.

In place of potassium chloride which is preferred any other chloride of the alkali metal or alkaline earth metal groups may be used.

Various changes may be made by those skilled in the art without departing from the spirit of my invention, as claimed.

I claim:

1. A process for producing aluminum chloride comprising dehydrating a mixture of aluminum sulphide and a chloride of an alkali forming metal, mixing a carbonaceous material to said reagents, heating the same in a closed retort to a point below the volatilization point of said chloride and condensing the aluminum chloride vapors formed.

2. A process of producing aluminum chloride comprising dehydrating a mixture of aluminum sulphide and a chloride of an alkali forming metal, heating the same in a closed retort to a point below the volatilization point of said chloride to form aluminum chloride and a sulphide of the alkali forming metal until all the chlorine of the chloride has combined with the aluminum and is alone volatilized and condensing the aluminum chloride vapors formed.

3. A process of producing aluminum chloride comprising mixing aluminum sulphide and potassium chloride, mixing a reducing agent with said reagents, heating the same in a closed retort to a point below the volatilization point of potassium chloride and condensing the aluminum chloride vapors formed.

4. A process of producing aluminum chloride comprising heating aluminum sulphide and a chloride of an alkali forming metal in a closed retort to a degree until all the chlorine of the chloride has combined with the aluminum to form aluminum chloride and is alone volatilized and condensing the aluminum chloride vapors formed.

In testimony whereof I have signed my name to this specification.

HENRY BLUMENBERG, JR.